US008249104B2

(12) United States Patent
Effenberger et al.

(10) Patent No.: US 8,249,104 B2
(45) Date of Patent: *Aug. 21, 2012

(54) OPTICAL NETWORK TERMINAL MANAGEMENT AND CONTROL INTERFACE OVER ETHERNET

(75) Inventors: Frank J. Effenberger, Freehold, NJ (US); Bo Gao, Shenzhen (CN); Wei Lin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/545,668

(22) Filed: Aug. 21, 2009

(65) Prior Publication Data
US 2010/0110898 A1 May 6, 2010

Related U.S. Application Data

(60) Provisional application No. 61/109,835, filed on Oct. 30, 2008.

(51) Int. Cl.
*H04J 3/16* (2006.01)
(52) U.S. Cl. .................................... 370/471; 370/465
(58) Field of Classification Search .......... 370/465, 370/466, 467, 389, 392, 395.21, 395.4; 713/160, 713/151; 398/66
See application file for complete search history.

(56) References Cited

U.S. PATENT DOCUMENTS

| 7,821,949 B2 * | 10/2010 | Mohan et al. | 370/241.1 |
| 2004/0073788 A1 * | 4/2004 | Kim et al. | 713/160 |
| 2006/0136715 A1 * | 6/2006 | Han et al. | 713/151 |
| 2010/0002592 A1 * | 1/2010 | Effenberger et al. | 370/241.1 |

FOREIGN PATENT DOCUMENTS

| CN | 1897497 A | 1/2007 |
| WO | 2010048892 A1 | 5/2010 |

OTHER PUBLICATIONS

Kadowaki, et al., "Specifications Proposal to G.986," Q2, Study Group: 15, Working Party 1. Geneva, May 11-14, 2009.
Kadowaki, et al., "Draft 2.1 for G.986," Q2, Study Group: 15, Working Party 1, Geneva, May 11-14, 2009.
Kadowaki, et al., "Specifications Proposal to G.986," Q2, Working Part 1, Teleconference, Jun. 30, 2009.
Qin, J., et al., "OAM Extensions in EPON Networks," Optical Instruments, vol. 27, No. 5, Oct. 2005, 4 pages.

(Continued)

*Primary Examiner* — Hanh Nguyen
(74) *Attorney, Agent, or Firm* — Conley Rose, P.C.; Grant Rodolph; Clint Wilkins

(57) ABSTRACT

An apparatus comprising a data framer configured to frame an external protocol extension message for transmission, the external protocol extension message comprising a header that indicates an external protocol extension and at least one type-length-value (TLV) comprising a type field, a length field, and a value field, wherein a format of the TLV is specified by a specific organization, and wherein the value field comprises information related to protocol functions external to the network. Also included is an apparatus comprising at least one component configured to implement a method comprising compiling an external protocol extension message comprising a plurality of TLVs and a header that indicates an external protocol extension, and transmitting the external protocol message.

21 Claims, 12 Drawing Sheets

OTHER PUBLICATIONS

Foreign Communication From a Related Counterpart Application, PCT Application PCT/CN2009/074686, International Search Report dated Feb. 4, 2010, 3 pages.

Foreign Communication From a Related Counterpart Application, PCT Application PCT/CN2009/074686, Written Opinion dated Feb. 4, 2010, 4 pages.

Foreign Communication From A Related Counterpart Application, Chinese Application No. 200980126032.3, Chinese Office Action dated May 31, 2012, 6 pages.

Foreign Communication From A Related Counterpart Application, Chinese Application No. 200980126032.3, Partial Translation of First Chinese Office Action dated May 31, 2012, 5 pages.

* cited by examiner

OPTICAL NETWORK TERMINAL MANAGEMENT AND CONTROL INTERFACE OVER ETHERNET

CROSS-REFERENCE TO RELATED APPLICATIONS

The present application claims priority to U.S. Provisional Patent Application 61/109,835, filed Oct. 30, 2008 by Frank J. Effenberger et al., and entitled "Optical Network Terminal Management and Control Interface over Ethernet," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ethernet technology is widely used in today's networks and is specified in the Institute of Electrical and Electronics Engineers (IEEE) 802.3 series of standards, which are incorporated herein by reference as if reproduced by their entirety. However, Ethernet technology does not readily support external networking features, such as some operation, administration, and management (OAM) features. Therefore, many networking features are being added to the IEEE 802.3 standards. Currently, Ethernet technology is used in passive optical networks (PONs), such as the Ethernet PON (EPON). The EPON system provides network access functionality using a Media Access Control (MAC) protocol, which comprises five different instances of MAC control messages, specified by distinct operation codes (opcodes), which define a Multi-Point Control Protocol (MPCP) among other things. The EPON system may also provide necessary network supervision and diagnosis functions using slow protocols, such as the Ethernet OAM protocol, which comprises three different OAM Packet Data Units (PDUs), specified by distinct subtypes.

Another PON system is the Gigabit PON (GPON) that is standardized by the International Telecommunication Union Telecommunication Standardization Sector (ITU-T). The GPON has a MAC control messaging channel referred to as the physical layer OAM (PLOAM) channel that is similar to the MPCP protocol. The PLOAM channel supports the functions of the MPCP channel and additional functions, including data privacy, protection switching, authentication, fault and performance monitoring, and configuration of a management channel. Additionally, the GPON has an upper layer management protocol referred to as the Optical Network Terminal (ONT) Management Control Interface (OMCI) that is similar to the Ethernet OAM protocol. The OMCI provides many more OAM features than the PLOAM, including configuration management, fault management, performance management, and security management.

SUMMARY

In one embodiment, the disclosure includes an apparatus comprising a data framer configured to frame an external protocol extension message for transmission, the external protocol extension message comprising a header that indicates an external protocol extension and at least one type-length-value (TLV) comprising a type field, a length field, and a value field, wherein a format of the TLV is specified by a specific organization, and wherein the value field comprises information related to protocol functions external to the network.

In another embodiment, the disclosure includes an apparatus comprising at least one component configured to implement a method comprising compiling an external protocol extension message comprising a plurality of TLVs and a header that indicates an external protocol extension, and transmitting the external protocol message.

In yet another embodiment, the disclosure includes a method comprising adding a header to a protocol extension message, wherein the header indicates that the protocol extension message comprises an organizational-specific protocol extension, formatting a control information according to an organizational format, adding the control information to the protocol extension message, adding a footer to the protocol extension message, and transmitting the protocol extension message.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for extending the features of the protocols in Ethernet based networks, such as the EPON, using external protocol extension messages. The external protocol extension messages may allow external organizations to encapsulate their own message formats, for instance to add organization specific management information or functions to the networks. The external protocol extension messages may have a plurality of message formats, which may be TLV formats, and allow the encapsulation of a plurality of external organization specific messages in a single Ethernet message. The encapsulated external organization specific messages, which may be typically fixed length messages, may be extended to variable length messages.

Figure 1:
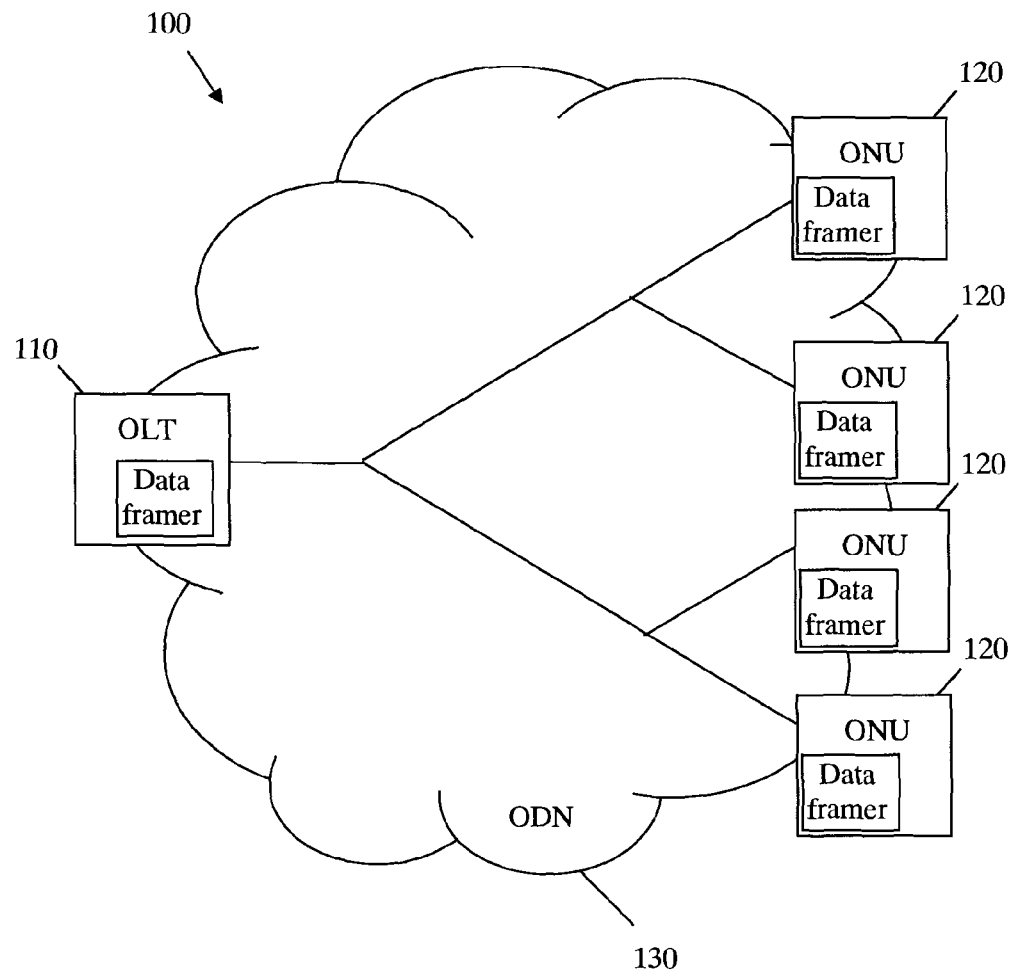
FIG. 1 is a schematic diagram of an embodiment of a PON.

FIG. 1 illustrates one embodiment of a PON 100. The PON 100 comprises an optical line terminal (OLT) 110, a plurality of optical network units (ONUs) 120, and an optical distribution network (ODN) 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an EPON defined by the IEEE 802.3ah standard, a 10 Gigabit EPON as defined by the IEEE 802.3av standard, an asynchronous transfer mode PON (APON), a broadband PON (BPON) defined by the ITU-T G.983 standard, a GPON defined by the ITU-T G.984 standard, or a wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110 and/or the ONUs 120 may comprise a data framer, which may be coupled to the transmitter and/or the receiver. The data framer may be any device located at the OLT 110 and/or the ONUs 120 that is configured to process data by framing the data into frames or obtaining the data from the frames according to a PON protocol, such as IEEE 802.3ah and/or 802.3av. The data framer may be hardware, such as a processor, comprising electronic or logic circuitry, which may be designed for such purpose. Alternatively, the data framer may be software or firmware, which may be programmed for such purpose. Specifically, the data framer may be configured to generate Ethernet messages, including OAM Packet Data Units (PDUs), slow protocol PDUs, and/or Ethernet MAC frames, which may be used to promote organization specific messages and extend functions in the PON 100. For instance, the external protocol extension messages may comprise organization specific management information.

Figure 2:
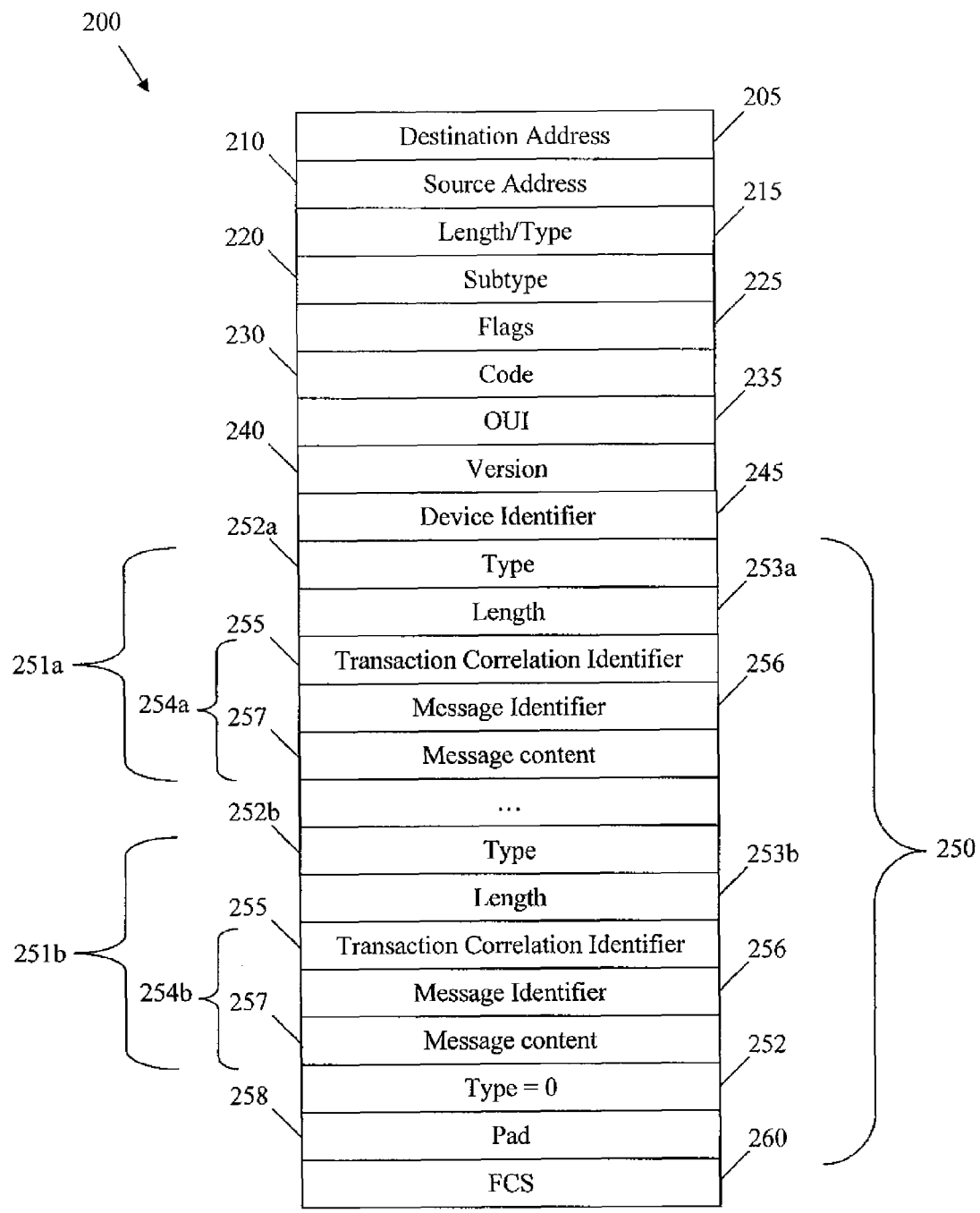
FIG. 2 is a schematic diagram of an embodiment of an external protocol extension message.

FIG. 2 illustrates an embodiment of an external protocol extension message 200, which may be generated or received by the data framer, for example at the OLT 110 and/or the ONU 120. The external protocol extension message 200 may be an OAM protocol data unit (PDU), for instance based on the 802.3 standard, which may extend the protocols in the network and/or promote external organization specific functions. Currently, there are three types of OAM PDUs specified by different codes or subtypes, which may be used to exchange information between OAM entities in an Ethernet based network. The codes currently used comprise a Code 0x00 that indicates an information OAM PDU, a Code 0x01 that indicates an Event Notification OAM PDU, and a Code 0x04 that indicates a Loopback Control OAM PDU. The external protocol extension message 200 may be a fourth type of OAM PDU associated with a Code 0xFE that may indicate an external extension OAM PDU.

The external protocol extension message 200 may comprise a destination address (DA) 205, a source address (SA) 210, a length/type 215, an subtype 220, a flags field 225, a code 230, an organization unique identifier (OUI) 235, a version 240, a device identifier 245, a payload 250, and a frame check sequence (FCS) 260. The DA 205 may comprise a network address, such as a MAC address, for a destination node that may be intended to receive the data, e.g. the OLT or one of the ONUs. The SA 210 may comprise a network address for a source node that may originate the external protocol extension message 200. The length/type 215 may indicate that the message's length and type corresponds to a slow protocol message. For instance, the length/type 215 may be set to 88-09 according to IEEE 802.3av. The subtype 220 may provide additional information regarding the external protocol extension message 200 type, e.g. by indicating that the external protocol extension message 200 is an OAM PDU. For instance, the subtype 220 may be assigned a value equal to 0x03 that signifies an OAM format. The flags field 225 may include various flags that may be set to indicate various information. The code 230 may indicate a type or format associated with at least part of the message 200. For example, the code 230 may be set to the value 0xFE to indicate that the message is an organization specific message (e.g., external extension OAM PDU), which may comprise information formatted according to an external organization format. The OUI 235 may specify the organization responsible for the message format. For instance, the OUI 235 may be set to a specific value to indicate that the message is formatted as specified by a specific organization, which may be a standards organization such as IEEE or ITU, an Enterprise such as HUAWEI, CISCO, or ALCATEL, or any other organization. The version 240 may specify the current version of the external protocol corresponding to the message. The device identifier 245 may indicate that the external protocol is extended to support the local network, which may be an EPON. The FCS 260 may be used for error detection and correction, such as a Cyclic Redundancy Check (CRC) or other checksum.

In an embodiment, the length of each of the DA 205 and SA 210 may be equal to about six bytes, the length of each of the length/type 215, the flags field 225, and the version 240 may be equal to about two bytes, the length of each of the subtype 220, the code 230, and the device identifier may be equal to about one byte, the length of the OUI 235 may be equal to about three bytes, and the length of the payload 250 may be at least about 36 bytes.

The payload 250 may comprise at least one control message that is formatted as specified by the organization associated with the OUI 235. Specifically, the payload 250 may comprise at least one organization specific message 251, such as an OMCI message. The payload 250 may comprise different organization specific messages 251 that may be different control messages comprising different control information or functions. For example, the payload 250 may comprise two organization specific messages 251a and 251b that are formatted per the same organization. As used herein, a number without any subsequent letters refers to a data structure generally, e.g. 251 refers to 251a and/or 251b. In contrast, a number followed by a letter refers to a specific data structure, e.g. 251a.

In an embodiment, each organization specific message 251 may be a TLV triplet, which may comprise a type field 252, a length field 253, and a value field 254, which may differ between the two organizations specific messages 251a and 251b. Each type field 252 may indicate a different control message, for instance for a different OAM function. As such, the type field 252a for the first organization specific message 251a may be set to a first value to indicate that the first organization specific message 251a corresponds to a first control function, while the type field 252b for the second organization specific message 251b may be set to a second value to indicate that the second organization specific message 251b corresponds to a second control function as specified by the same organization. Accordingly, the length field 253a may be different than the length field 253b. Similarly, the length and content of each of the value field 254a and the value field 254b may be different, because they may comprise different control information. Thus, the length field 253a and the length field 253b may be used to delineate the end of the first organization specific message 251a and the second organization specific message 251b, respectively. Further, each value field 254 may comprise a transaction correlation identifier 255, a message identifier 256, and a message content portion 257. The transaction correlation identifier 255 may correspond to the organization specific messages 251 with other messages and/or transactions. The message identifier 256 may uniquely identify the corresponding organization specific messages 251. Finally, the message content portion 257 may comprise the content of the organization specific messages 251, such as control information.

In an embodiment, the length of the type field 252 may be equal to about one byte, the length of each of the length field 253 and the transaction correlation identifier 255 may be equal to about two bytes, the length of the message identifier 256 may be equal to about four bytes, and the length of the message content portion 257 may vary between the different organization specific messages 251. If the total length of the organization specific messages 251 is less than the total length of the payload 250, the type field 252, which may be subsequent to the last organization specific message 251, may be set to about zero to indicate the end of the payload 250. Thus, the remaining portion of the payload 250 may comprise a pad 258. The pad 258 may make the length of the payload 250 about equal to an integer multiple of length of the organization specific message 251. For example, the length of the pad 258 may be equal to about zero. Alternatively, if the payload 250 length is limited to about 36 bytes, the length of the pad 258 may be equal to about $$36 - \sum_{i=1}^{N} (9 + L_i) - 1$$

bytes, where $L_i$ is the length or the $i^{th}$ organization specific message 251, N is the quantity of organization specific messages 251 in the payload 250, and i is an integer. As such, the type field 252 may be set to about zero in the last empty organization specific message 251 in the payload 250 to indicate the end of the payload 250.

Figure 3:
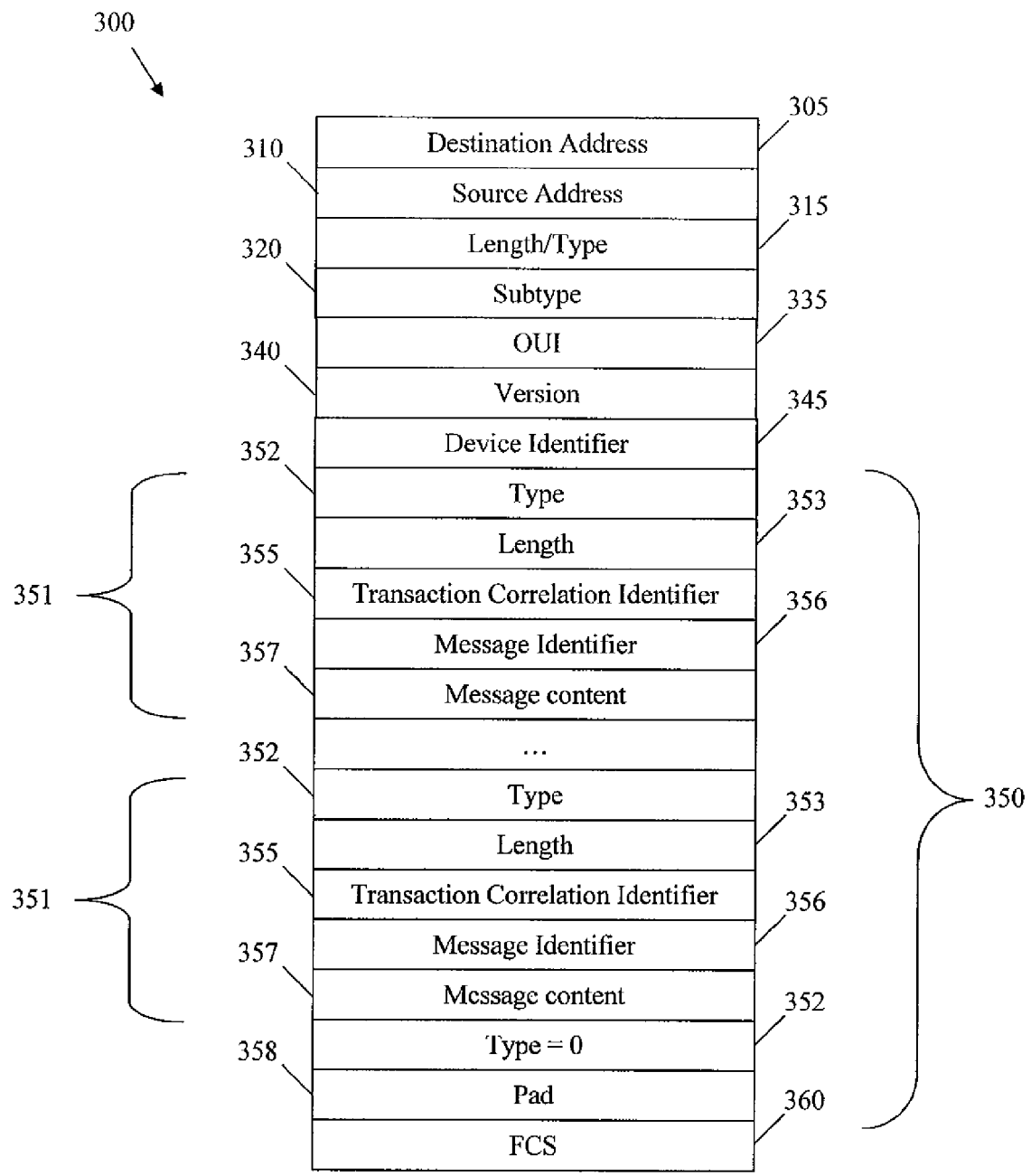
FIG. 3 is a schematic diagram of another embodiment of an external protocol extension message.

FIG. 3 illustrates an embodiment of an external protocol extension message 300, which may be generated or received by the data framer, for example at the OLT 110 and/or the ONU 120. The external protocol extension message 300 may be a slow protocol PDU, such as an Ethernet OAM PDU based on the 802.3 standard, which may extend the network protocol and/or promote external organization specific functions. Specifically, the external protocol extension message 300 may be associated with a subtype value that may indicate an extension to the local protocol.

The external protocol extension message 300 may comprise a DA 305, a SA 310, a length/type 315, a subtype 320, an OUI 335, a version 340, a device identifier 345, a payload 350, and a FCS 360. The subtype 320 may be set to the value 0xFE to indicate that the message is an organization specific message (e.g., external extension OAM PDU), which may comprise information formatted according to an external organization format. In an embodiment, the length of the subtype 320 may be equal to about one byte.

The remaining fields of the external protocol extension message 300 may be configured similar to the corresponding fields of the external protocol extension message 200. For instance, the payload 350 may comprise at least one organization specific message 351, such as an OMCI message, which may have a smaller length than the payload 350, and optionally a pad 358. The organization specific message 351 may comprise a type field 352, which may be set to about zero for the last organization specific message 351 in the payload 350. The organization specific message 351 may also comprise a length field 353, a transaction correlation identifier 355, a message identifier 356, and a message content portion 357.

Figure 4:
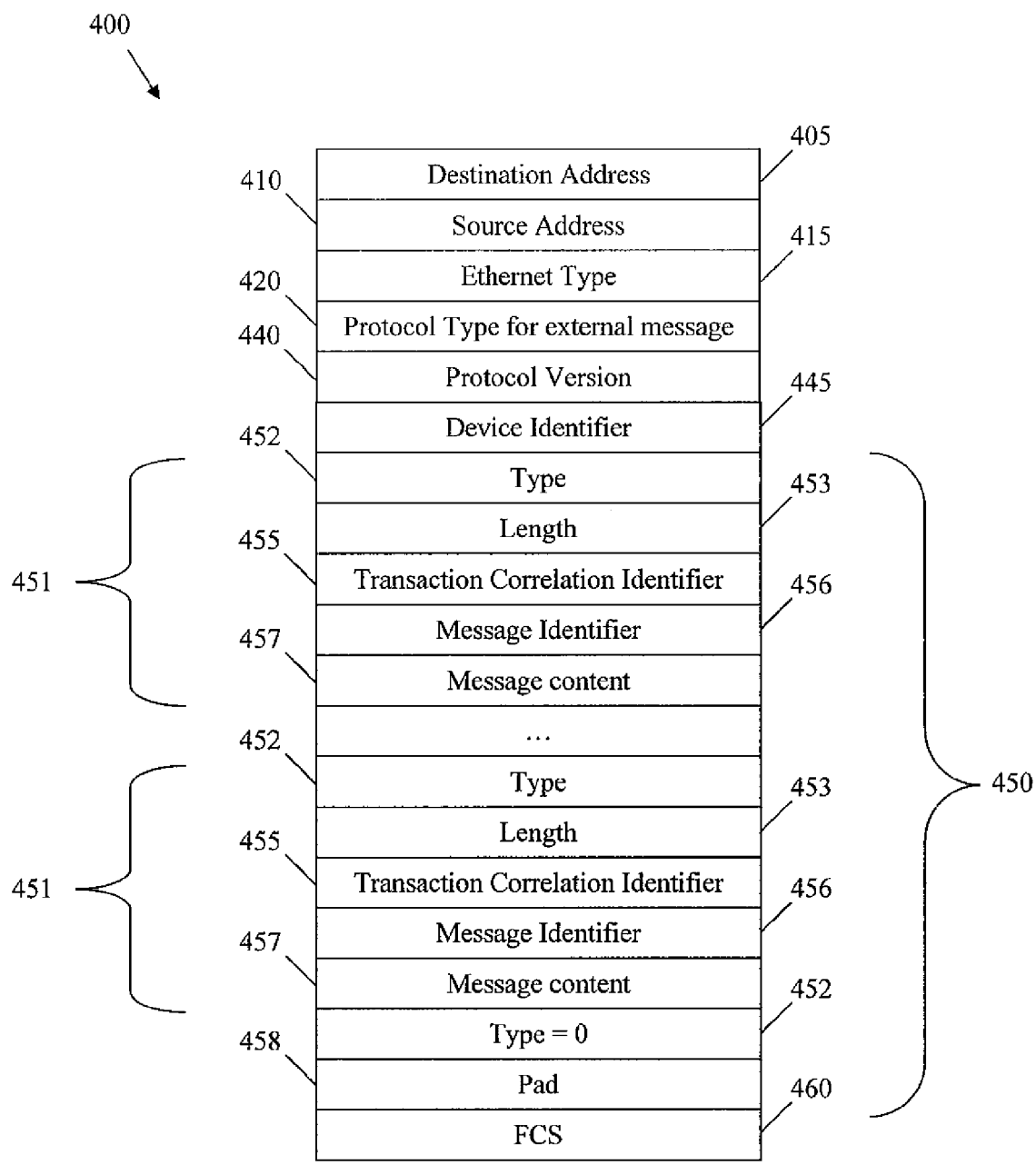
FIG. 4 is a schematic diagram of another embodiment of an external protocol extension message.

FIG. 4 illustrates an embodiment of an external protocol extension message 400, which may be generated or received by the data framer, for example at the OLT 110 and/or the ONU 120. The external protocol extension message 400 may be an Ethernet MAC frame, for instance based on the IEEE 802.3 Ethernet II framing networking standard, which may extend the network protocol and/or promote external organization specific functions. Specifically, the external protocol extension message 300 may be associated with a combination of an Ethernet type (Ethertype) and a protocol type for external message that may indicate an OUI extension message.

The external protocol extension message 400 may comprise a DA 405, a SA 410, an Ethernet type 415, a protocol type for external message 420, a protocol version 440, a device identifier 445, a payload 450, and a FCS 460. The Ethernet type 415 may be set to a predetermined value that may signify a "local experimental" frame. For example, the Ethernet type 415 may be set to the value 0x88b5 or 0x88b6. Additionally, the protocol type for external message 420 may indicate that the protocol in the message is an external protocol for an external organization specific message. In an embodiment, the length of the Ethernet type 415 may be equal to about two bytes and the length of the protocol type for external message 420 may be equal to about one byte. In some embodiments, the external protocol extension message 400 may also comprise an OUI, which may specify the organization responsible for the message format.

In an embodiment, the Ethernet type 415 may have a length equal to about two octets (or bytes) and the protocol type for external message 420 may have a length equal to about one byte. The remaining fields of the external protocol extension message 400 may be configured substantially similar to the corresponding fields of the external protocol extension message 200. For instance, the payload 450 may comprise at least one organization specific message 451, such as an OMCI message, which may have a smaller length than the payload 450, and optionally a pad 458. The payload 450 may have a length of at least about 42 bytes, and each organization specific message 451 may comprise a type field 452, a length field 453, a transaction correlation identifier 455, a message identifier 456, and a message content portion 457.

Figure 5:
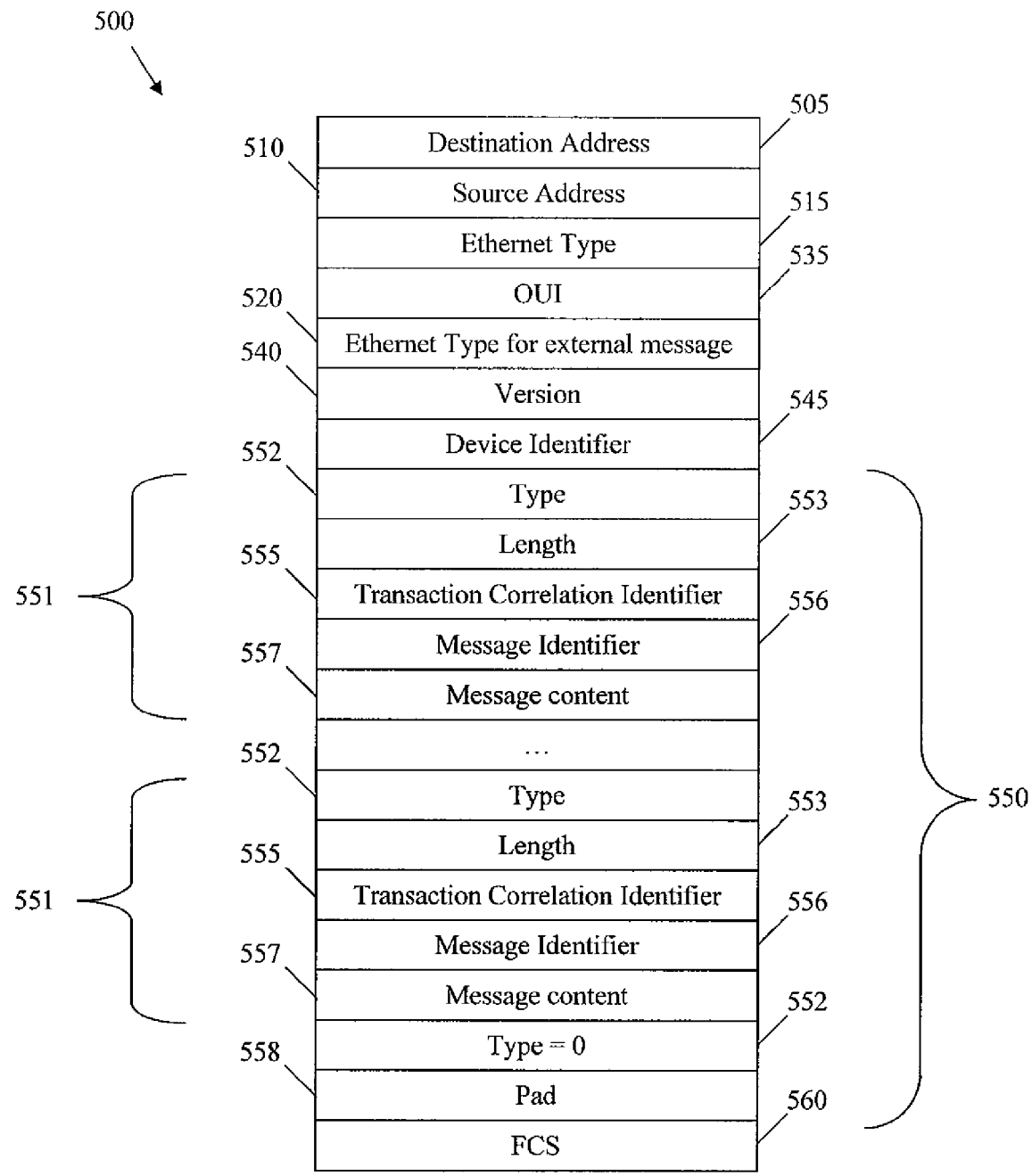
FIG. 5 is a schematic diagram of another embodiment of an external protocol extension message.

FIG. 5 illustrates another embodiment of an external protocol extension message 500, which may be generated or received by the data framer, for example at the OLT 110 and/or the ONU 120. The external protocol extension message 500 may be an Ethernet MAC frame, for instance based on the IEEE 802.3 Ethernet II framing networking standard, which may extend the network protocol and/or promote external organization specific functions. Specifically, the external protocol extension message 500 may be associated with a combination of an Ethertype, OUI, and an Ethernet type for external message, which may indicate an OUI extension message.

The external protocol extension message 500 may comprise a DA 505, a SA 510, an Ethernet type 515, an Ethernet type for external message 520, an OUI 535, a version 540, a device identifier 545, a payload 550, and a FCS 560. The Ethernet type 515 may be set to a predetermined value that may signify an "OUI extended" frame. For example, the Ethernet type 515 may be set to the value 0x88b7. Additionally, the OUI 535 may specify the organization responsible for the message format, and the Ethernet type for external message 520 may indicate that Ethernet type related to the external message, which may be different than the Ethertype of the local network. The length of each of the Ethernet type 515 and the Ethernet type for external message 520 may be equal to about two bytes, and the length of the OUI 535 may be equal to about three bytes.

The remaining fields of the external protocol extension message 500 may be configured similar to the corresponding fields of the external protocol extension message 200. For instance, the payload 550 may comprise at least one organization specific message 551, such as an OMCI message, which may comprise a type field 552, a length field 553, a transaction correlation identifier 555, a message identifier 556, and a message content portion 557. The payload 550 may have a length of at least about 38 bytes and may comprise a pad 558 if the total length of all the organization specific messages 551 of the payload 550 is smaller than the length of the payload 550.

Figure 6:
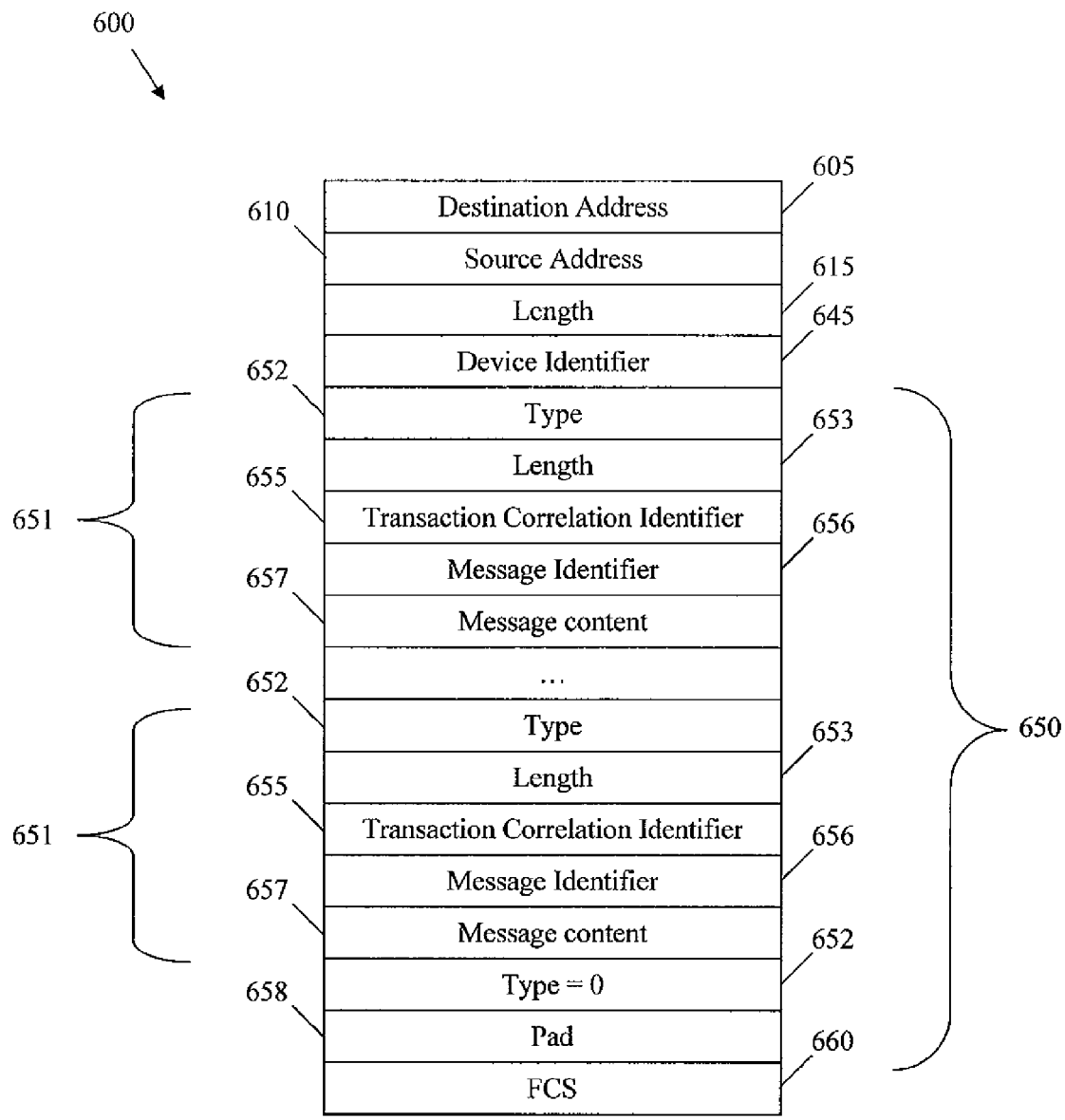
FIG. 6 is a schematic diagram of another embodiment of an external protocol extension message.

FIG. 6 illustrates an embodiment of an external protocol extension message 600, which may be generated or received by the data framer, for example at the OLT 110 and/or the ONU 120. The external protocol extension message 600 may be an Ethernet MAC frame, for instance based on the IEEE 802.3 standard, which may extend the network protocol and/or promote external organization specific functions. Specifically, the external protocol extension message 600 may be associated with a DA that may indicate a dedicated channel that extends the network protocol.

The external protocol extension message 600 may comprise a DA 605, a SA 610, a Length field 615, a device identifier 645, a payload 650, and a FCS 660. The DA 605 may comprise a multicast address, which may correspond to a specific channel for transmitting packets other than standard data packets, such as control or network management packets. The SA 610 may indicate the source of the transmitted packet, such as a network address for a source node that originated the external protocol extension message 600. The Length field 615 may indicate the length of the external protocol extension message 600, for instance in bytes. The length of each of the DA 605 and SA 610 may be equal to about six bytes, and the size of the Length field 615 may be equal to about two bytes.

The remaining fields of the external protocol extension message 600 may be configured similar to the corresponding fields of the external protocol extension message 200. For instance, the payload 650 may comprise at least one organization specific message 651, such as an OMCI message, which may comprise a type field 652, a length field 653, a transaction correlation identifier 655, a message identifier 656, and a message content portion 657. The payload 650 may have a length of at least about 45 bytes, and may also comprise a pad 658.

Figure 7:
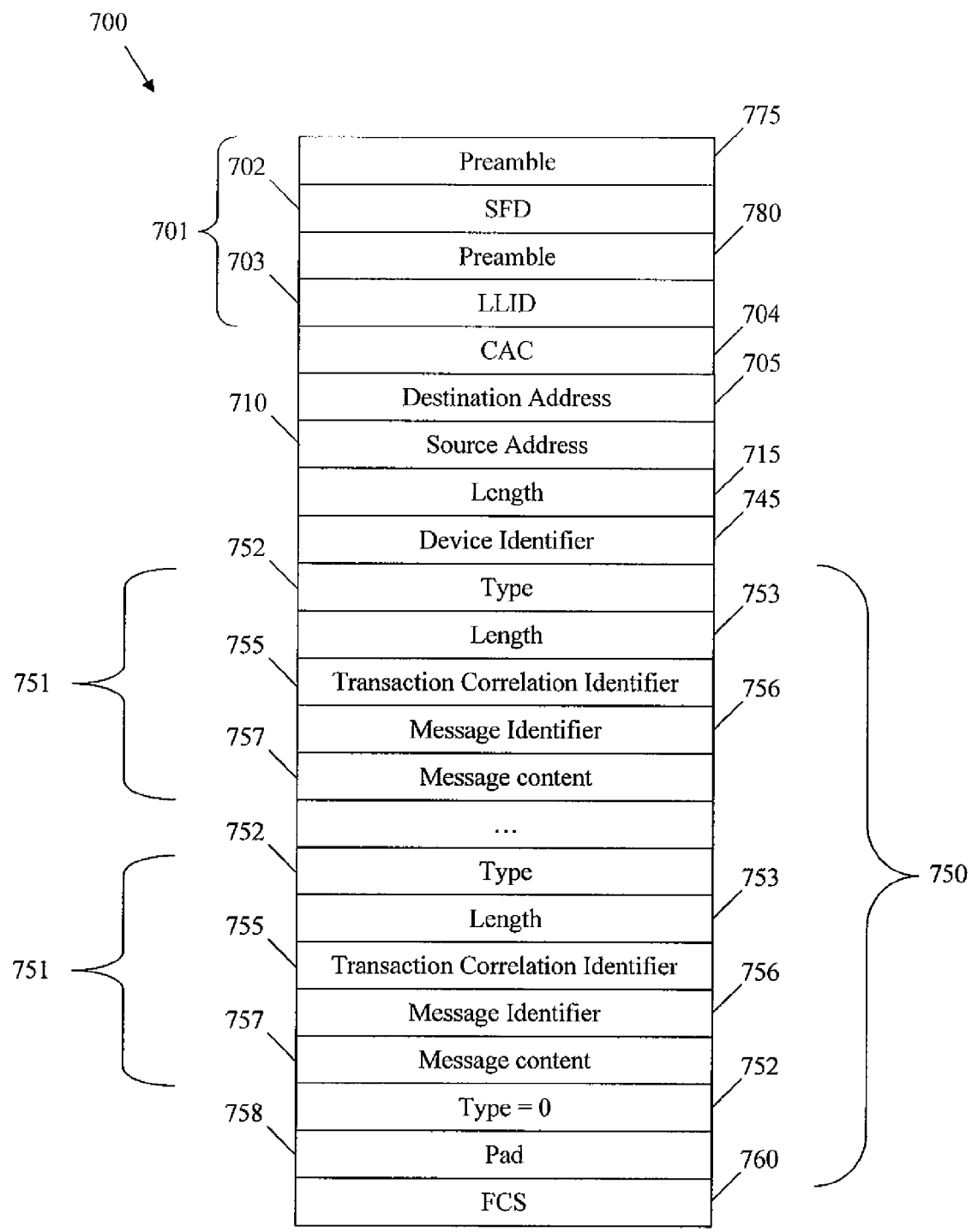
FIG. 7 is a schematic diagram of another embodiment of an external protocol extension message.

FIG. 7 illustrates an embodiment of an external protocol extension message 700, which may be generated or received by the data framer, for example at the OLT 110 and/or the ONU 120. The external protocol extension message 700 may be an Ethernet MAC frame, for instance that supports the IEEE 802.1D bridging requirements, which may extend the network protocol and/or promote external organization specific functions. Specifically, the external protocol extension message 700 may be associated with a Logical Link Identifier (LLID), which may indicate an external channel (e.g. OMCI channel) that extends the network protocol. Further, a MPCP message may be configured and used, as described below, to separate the external channel from a standard data channel in a network, such as an EPON, that supports a single channel.

The external protocol extension message 700 may comprise a Preamble 701 comprising a first preamble 775, a start of frame delimiter (SFD) 702, a second preamble 780, and a LLID 703. In an embodiment, the first preamble 775 and the second preamble 780 may comprise a specific binary pattern, which may specify "sync characters" used for synchronization purposes. The SFD 702 may be a predetermined binary pattern that signifies that the first bit subsequent to the SFD 702 may be the first bit of the external protocol extension message 700. The LLID 703 may be a two-byte tag that comprises a 1-bit mode indicator, e.g. in point-to-point or broadcast mode, and a 15-bit ONU Identifier (ID).

Generally, the LLID may be used in an EPON to emulate point-to-point communications based on IEEE 802.1D bridging, for instance between two ONUs. As such, each ONU may transmit frames comprising its own assigned LLID, and may receive and filter frames based on the LLID in the frames. For instance, when the ONU receives the frame, the frame may be demultiplexed based on its LLID by an emulation sublayer below the Ethernet MAC layer, and hence the frame may be strip off its LLID before forwarding the frame to the MAC entity. When transmitting a frame corresponding to a MAC entity, the LLID may be added to the frame. Thus, the LLID may only be used in the frame within the EPON. Specifically, the LLID 703 in the external protocol extension message 700 may comprise a specified value instead of the ONU's assigned value, which may signify a dedicated for external messages instead of a transmission channel associated with an ONU in the network.

The external protocol extension message 700 may also comprise a connection admission control (CAC) field 704, a DA 705, a SA 710, a Length field 715, a device identifier 745, a payload 750, and a FCS 760. The CAC field 704 may be used for checking or validating the SFD 702 and LLID 703. The DA 705 may comprise the network address of the destination of the external protocol extension message 700, such as an ONU or OLT, and the SA 710 may comprise the network address of the source of the external protocol extension message 700. The Length field 715 may indicate the length of the external protocol extension message 700, for instance in bytes. The device identifier 745 may indicate that the external protocol is extended to support the local network, which may be an EPON. In an embodiment, the length of each of the SFD 702, the CAC 704, and the device identifier 745 may be equal to about one byte, the length of each of the LLID 703 and Length field 715 may be equal to about two bytes, the length of each of the DA 705 and DA 710 may be equal to about six bytes.

The remaining fields of the external protocol extension message 700 may be configured similar to the corresponding fields of the external protocol extension message 200. For instance, the payload 750 may comprise at least one organization specific message 751, such as an OMCI message, which may comprise a type field 752, a length field 753, a transaction correlation identifier 755, a message identifier 756, and a message content portion 757. The payload 750 may have a length of at least about 45 bytes, and may also comprise a pad 758.

Figure 8:
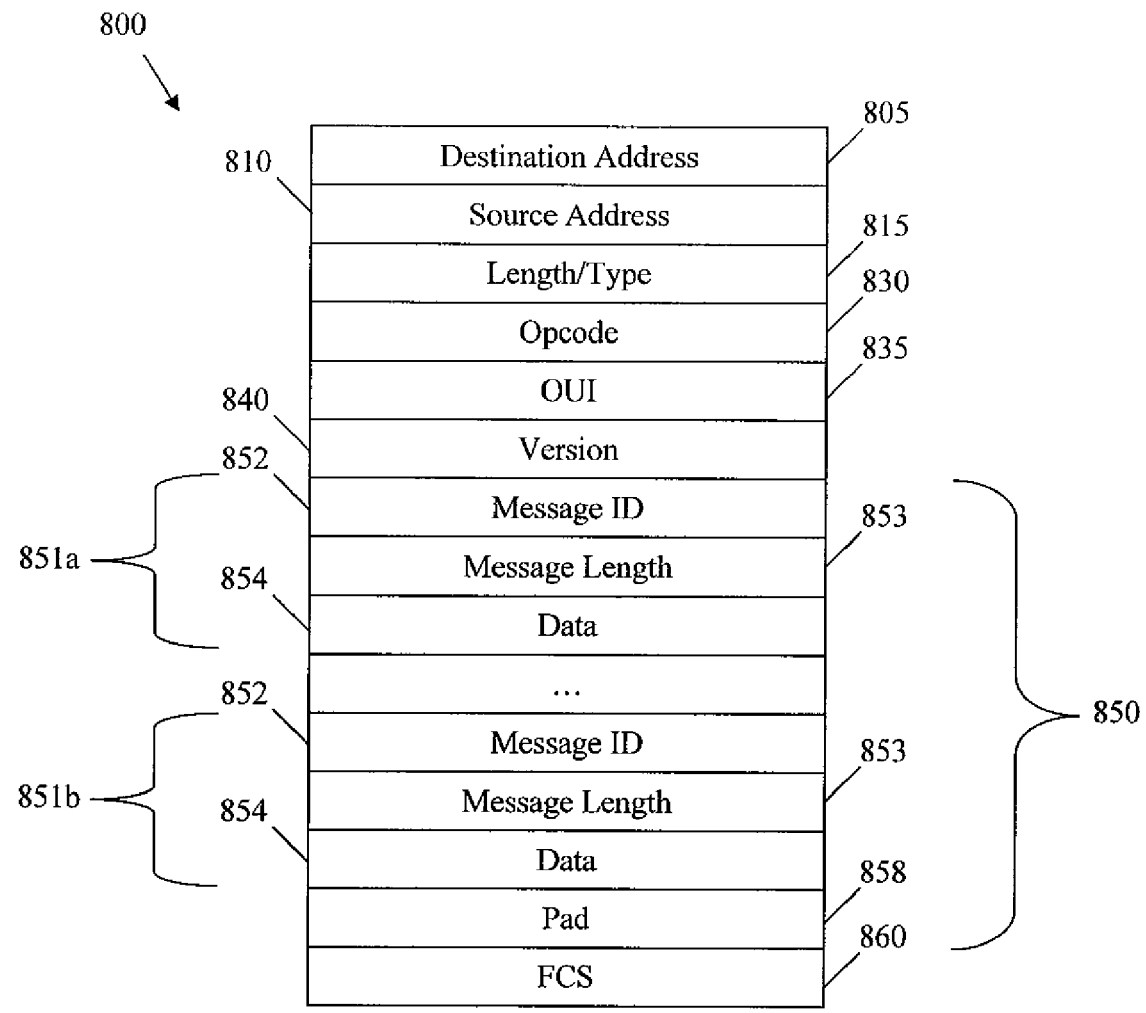
FIG. 8 is a schematic diagram of another embodiment of a MPCP message.

FIG. 8 illustrates an embodiment of a MPCP message 800, which may be used to separate the external (or OMCI) channel of the external protocol extension message 700 from the data channel in the network, such as the EPON. Generally, in networks, such as GPONs, an OMCI connection may be associated with a dedicated GPON Encapsulation Method (GEM) port (at the OLT or ONU) using specific PLOAM messages. For instance, an OMCI channel may be set up using a Configure Port-ID message, which may comprise data generated or received by the data framer, for example at the OLT 110 and/or the ONU 120.

The MPCP message 800 may comprise a DA 805, a SA 810, a length/type 815, an opcode 830, an OUI 835, a version 840, a payload 850, and a FCS 860. The DA 805 may comprise the network address of the same destination node (e.g. ONU or OLT) specified in the DA 705 of the external protocol extension message 700. Similarly, the SA 810 may comprise the same network address for the source node specified in the SA 710. The length/type 815 may indicate that the message's length and type corresponds to a MAC control message. For instance, the length/type 815 may be set to 88-08 according to IEEE 802.3av. The opcode 830 may be set to a value, for example equal to 0xFE, which may signify generally an extended MAC control message. The OUI 835 may specify the organization responsible for the message format, the version 840 may specify the current version of the external protocol corresponding to the subsequent message(s), and the FCS 860 may be used for error detection and correction. In an embodiment, the length of each of the DA 805 and SA 810 may be equal to about six bytes, the length of each of the length/type 815, the opcode 830, and the version 840 may be equal to about two bytes, the length of the OUI 835 may be equal to about three bytes, and the length of the payload 850 may be equal to about 39 bytes.

The payload 850 may comprise at least one control message, which may be formatted as specified by the organization associated with the OUI 835. Specifically, the payload 850 may comprise at least one organization specific message 851, such as a PLOAM message. The payload 850 may comprise different organization specific messages 851 that may be different control messages comprising different control information or functions. For example, the payload 850 may comprise two organization specific messages 851a and 851b that are formatted per the same organization.

In an embodiment, each organization specific message 851 may comprise a message ID 852, a message length 853, and a data portion 854, which may differ between the two organization specific messages 851a and 851b. Each message ID 852 may indicate the beginning and/or order of one organization specific message 851. The message length 853 may specify the length of the corresponding organization specific message 851 from the message ID 852 to the last byte in the organization specific message 851. As such, the combination of the message ID 852 and the message length 853 may be used to delineate each organization specific message 851 in the payload 850.

In an embodiment, the length of each of the message ID 852 and the message length 853 may be equal to about one byte, and the length of the data portion 854 may vary between the different organization specific messages 851. If the total length of the organization specific messages 851 is less than the total length of the payload 850, the remaining portion of the payload 850 may comprise a pad 858. The length of the pad 858 may be equal to the difference between the length of the payload 850 (e.g. about 39 bytes) and the total length of all the organization specific messages 851.

Figure 9:
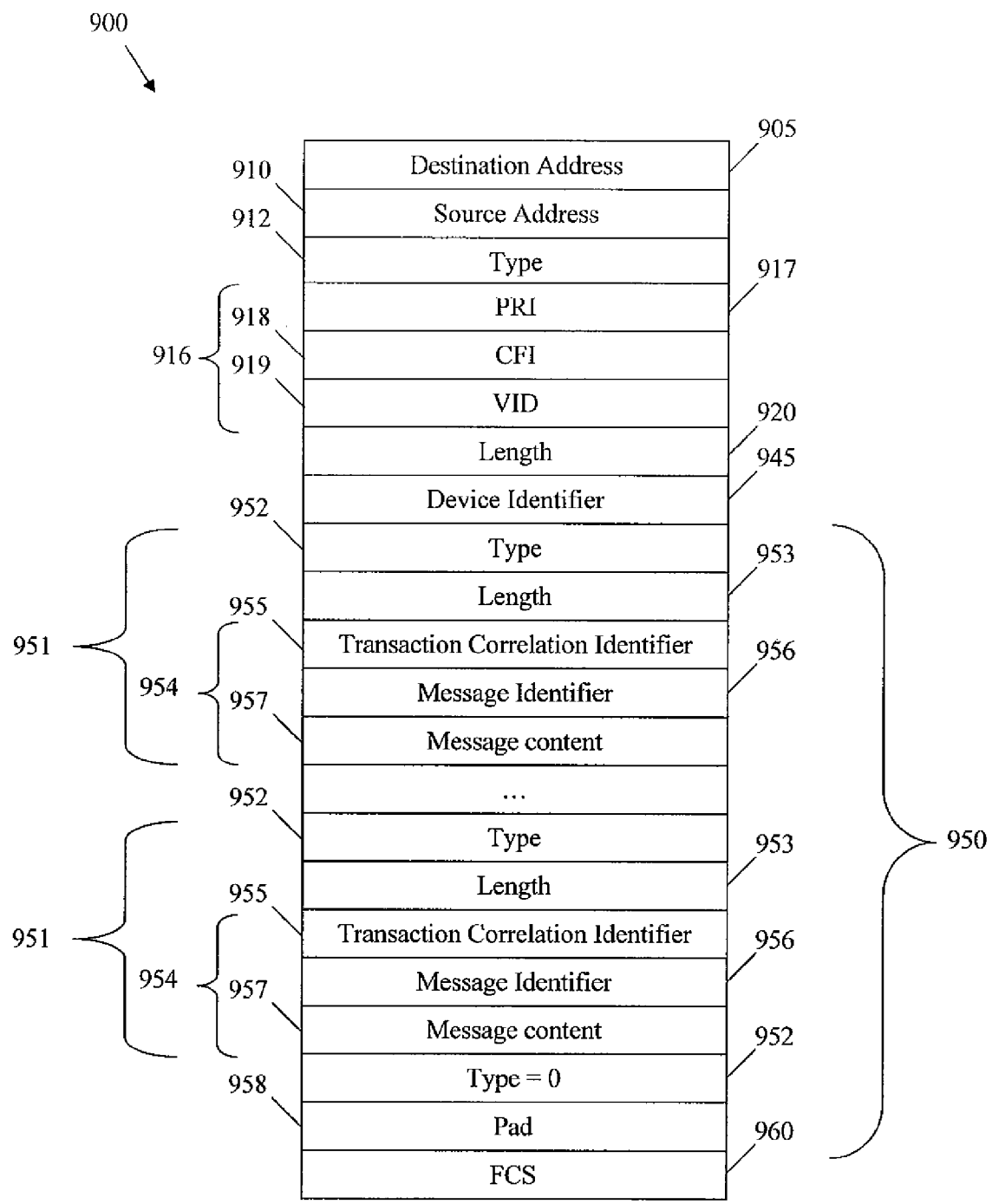
FIG. 9 is a schematic diagram of another embodiment of an external protocol extension message.

FIG. 9 illustrates an embodiment of an external protocol extension message 900, which may be generated or received by the data framer, for example at the OLT 110 and/or the ONU 120. The external protocol extension message 900 may be an Ethernet MAC frame, for instance based on the IEEE 802.3 standard, which may extend the network protocol and/or promote external organization specific functions. Specifically, the external protocol extension message 900 may be associated with a Virtual Local Area Network (VLAN) Identifier (ID), which may indicate an extension to the network protocol.

The external protocol extension message 900 may comprise a DA 905, a SA 910, a Type 912, a VLAN ID 916, a Length field 920, a device identifier 945, a payload 950, and a FCS 960. The Type 912 may be set to a predetermined value that indicates that the subsequent fields constitute a VLAN ID. For instance, the Type 912 may be set to the value 0x8100 to indicate the subsequent fields represent an IEEE 802.1q VLAN ID. The VLAN ID 916 may comprise a priority (PRI) field 917, a canonical format identifier (CFI) 918, and a VLAN ID (VID) for external message 919. The PRI field 917 may indicate the priority of the external protocol extension message 900, and the CFI 918 may indicate whether the MAC address in the message is in a canonical format. The VID for external message 919 may indicate a VID for an external message, and may be set to a specific value, which may specify that the message is associated with a virtual channel dedicated for OMCI. The Length field 920 may indicate the length of the external protocol extension message 900, for instance in bytes. In an embodiment, the length of the type 915 may be equal to about 16 bits, the length of the PRI field 917 may be equal to about three bits, the length of the CFI 918 may be equal to about one bit, the length of the VID for external message 919 may be equal to about 12 bits, and the size of the Length field 920 may be equal to about 16 bits.

The remaining fields of the external protocol extension message 900 may be configured similar to the corresponding fields of the external protocol extension message 200. For instance, the payload 950 may comprise at least one organization specific message 951, such as an OMCI message, which may comprise a type field 952, a length field 953, a transaction correlation identifier 955, a message identifier 956, and a message content portion 957. The payload 950 may have a length of at least about 43 bytes, and may also comprise a pad 958. The pad 958 may make the length of the payload 950 about equal to an integer multiple of length of the organization specific message 951. For example, the length of the pad 958 may be equal to about zero or about $$8 \times \left( 43 - \sum_{i=1}^{N}(9 + L_i) - 1 \right)$$

bytes, where $L_i$ is the length or the $i^{th}$ organization specific message 951, N is the quantity of organization specific messages 951 in the payload 950, and i is an integer. Accordingly, the type field 954 may be set to about zero in the last empty organization specific message 951 in the payload 950.

Figure 10:
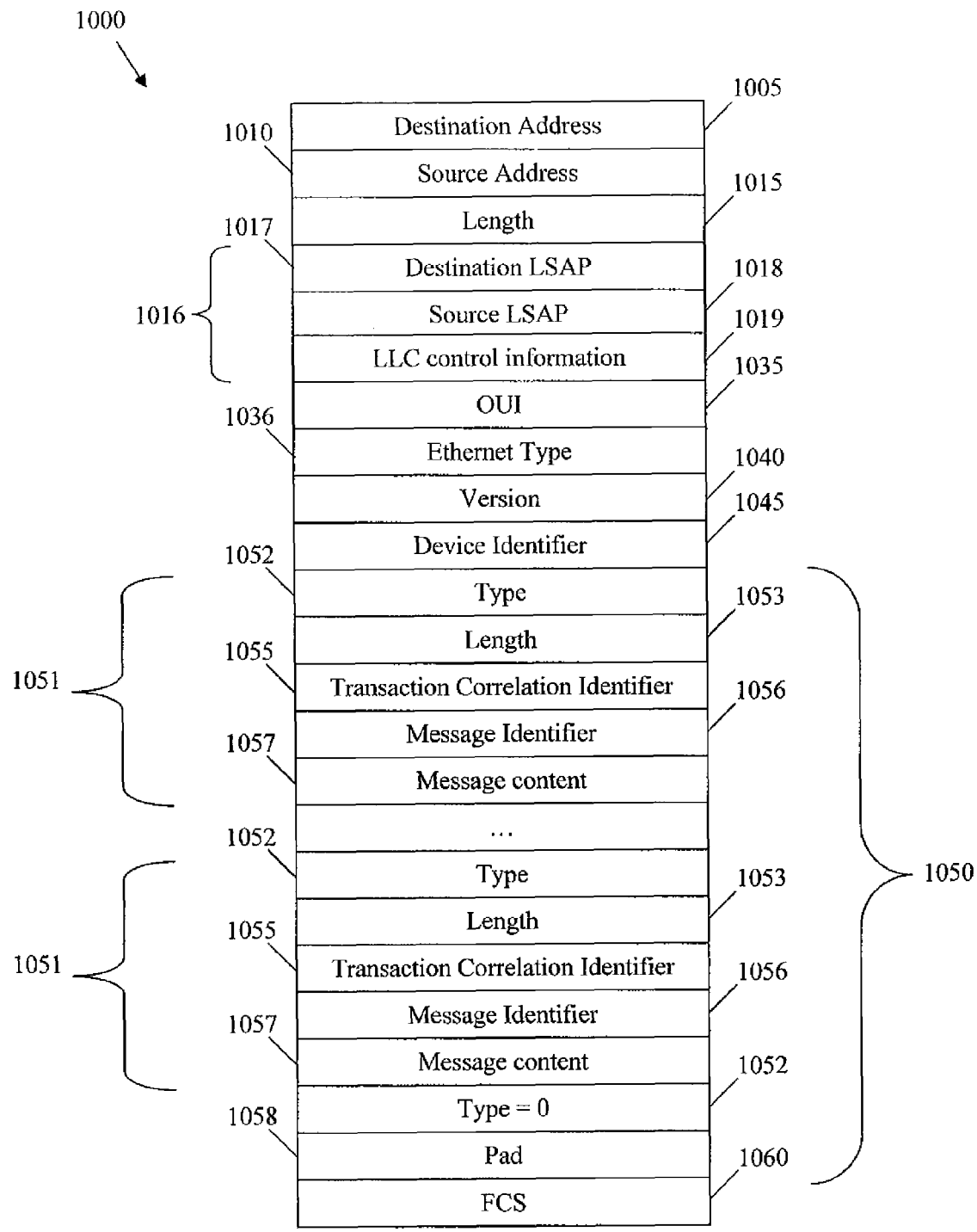
FIG. 10 is a schematic diagram of another embodiment of an external protocol extension message.

FIG. 10 illustrates an embodiment of an external protocol extension message 1000, which may be generated or received by the data framer, for example at the OLT 110 and/or the ONU 120. The external protocol extension message 1000 may be an Ethernet MAC frame, for instance based on the IEEE 802.3 standard, which may extend the network protocol and/or promote external organization specific functions. Specifically, the external protocol extension message 1000 may be associated with a logical link control (LLC) frame, which may indicate an extension to the network protocol, such as the EPON.

The external protocol extension message 1000 may comprise a DA 1005, a SA 1010, a Length field 1015, a LLC frame 1016, an OUI 1035, an Ethernet type 1036, a version 1040, a device identifier 1045, a payload 1050, and a FCS 1060. The Length field 1015 may indicate the length of the external protocol extension message 1000, for instance in bytes. The LLC frame 1016 may comprise a destination Link Service Access Point (LSAP) 1017, a source LSAP 1018, and a LLC control information portion 1019, which may comprise LLC data or higher layer protocol data. The fields of the LLC frame 1016 may be assigned specific values that may indicate that the external protocol is extended to support the local network, which may be an EPON. In an embodiment, the size of the Length field 1053 may be equal to about two bytes, and the length of each of the destination LSAP 1017, source LSAP 1018, and LLC control information portion 1019 may be equal to about one byte.

The remaining fields of the external protocol extension message 1000 may be configured similar to the corresponding fields of the external protocol extension message 200. For instance, the payload 1050 may comprise at least one organization specific message 1051, such as an OMCI message, which may comprise a type field 1052, a length field 1053, a transaction correlation identifier 1055, a message identifier 1056, and a message content portion 1057. The payload 1050 may have a length of at least about 35 bytes, and may also comprise a pad 1058.

Figure 11:
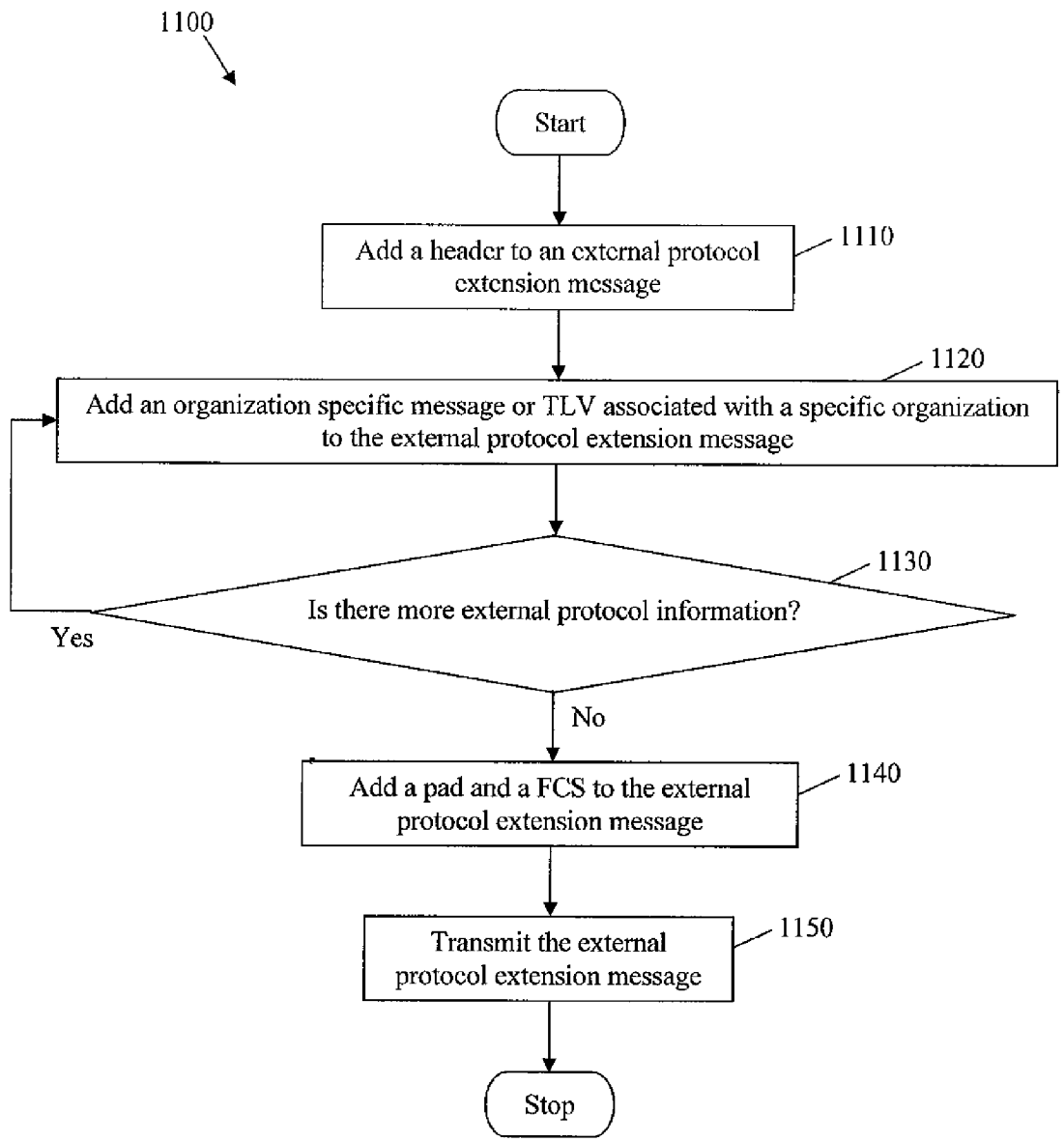
FIG. 11 is a flowchart of an embodiment of a message framing method.

FIG. 11 illustrates one embodiment of a message framing method 1100, which may be used to encapsulate external protocol information into an external protocol extension message, such as one of the external protocol extension messages 200, 300, 400, 500, 600, 700, 900, or 1000, to extend the local network, such as the EPON. The message framing method 1100 may also be used to encapsulate information related to the external protocol information into a MPCP message, such as the MPCP message 800.

The message framing method 1100 may begin at block 1110, where a header may be added to the external protocol extension message. The header may comprise a DA, a SA, and a device identifier. Additionally, the header may comprise at least one of a code field, type or subtype field, OUI, LLID, VLAN ID, LLC frame, version field, or combinations hereof. The message framing method 1100 may then proceed to block 1120, where an organization specific message or TLV associated with a specific organization, such as the organization specific message 251, 351, 451, 551, 651, 751, 951, or 1051, may be added to the external protocol extension message.

Next, at block 1130, a determination may be made as to whether there is more external protocol information corresponding to the specified organization. For instance, the OLT or ONT may need to communicate additional OAM, PLOAM, OMCI, and/or MAC control protocol related data. The message framing method 1100 may return to block 1120 if the condition in block 1130 is met or may proceed to block 1140 if there is no more external protocol information. At block 1140, the message framing method 1100 may add a pad (if required) and a FCS to the external protocol extension message. Next, at block 1150, the message framing method 1100 may transmit the external protocol extension message. In other embodiments, the message framing method 1100 may additionally or alternatively receive the transmitted external protocol extension message and obtain the external protocol control information by parsing the external protocol extension message, for instance by substantially executing the reverse sequence of blocks above.

Figure 12:
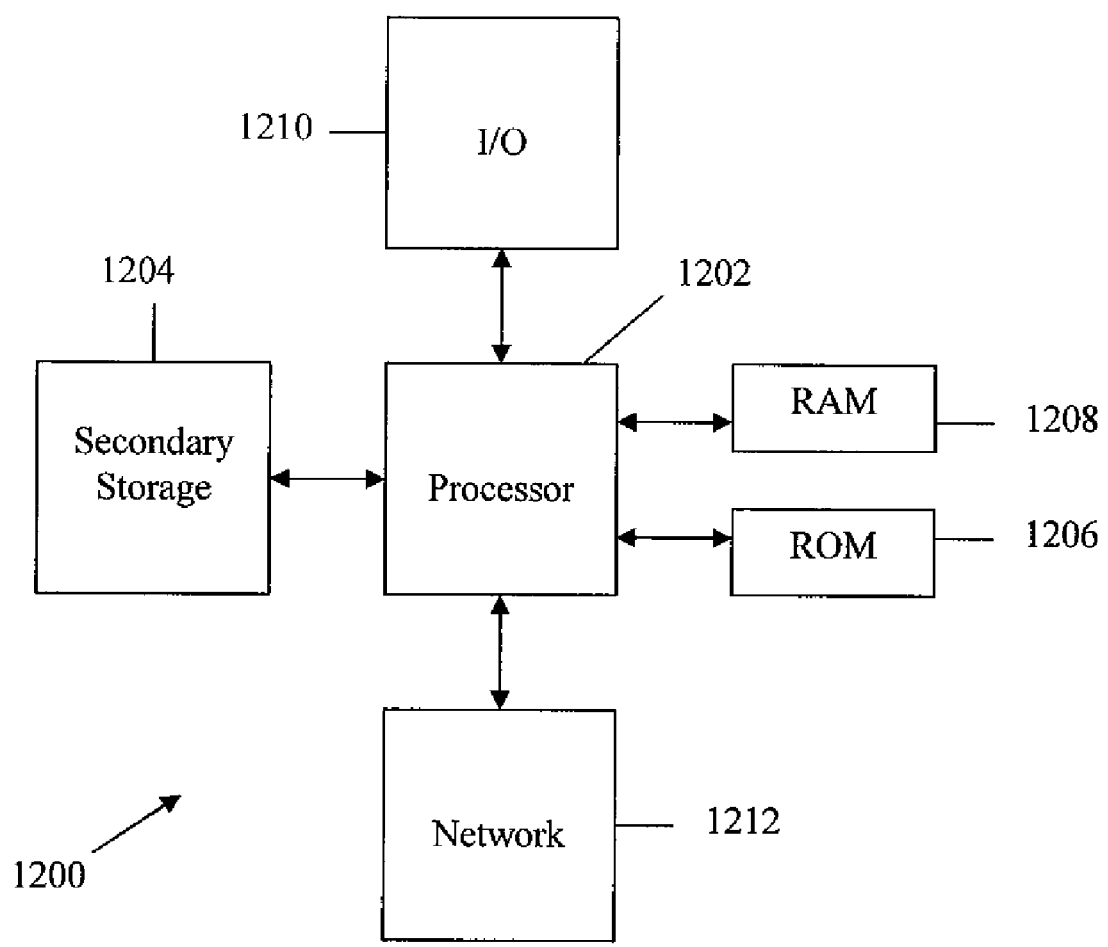
FIG. 12 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 12 illustrates a typical, general-purpose network component 1200 suitable for implementing one or more embodiments of the components disclosed herein. The network component 1200 includes a processor 1202 (which may be referred to as a central processor unit or CPU) that is in communication with memory devices including secondary storage 1204, read only memory (ROM) 1206, random access memory (RAM) 1208, input/output (I/O) devices 1210, and network connectivity devices 1212. The processor 1202 may be implemented as one or more CPU chips, or may be part of one or more application specific integrated circuits (ASICs).

The secondary storage 1204 is typically comprised of one or more disk drives or tape drives and is used for non-volatile storage of data and as an over-flow data storage device if RAM 1208 is not large enough to hold all working data. Secondary storage 1204 may be used to store programs that are loaded into RAM 1208 when such programs are selected for execution. The ROM 1206 is used to store instructions and perhaps data that are read during program execution. ROM 1206 is a non-volatile memory device that typically has a small memory capacity relative to the larger memory capacity of secondary storage 1204. The RAM 1208 is used to store volatile data and perhaps to store instructions. Access to both ROM 1206 and RAM 1208 is typically faster than to secondary storage 1204.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A passive optical network (PON) apparatus comprising:
a data framer configured to frame an external protocol extension message as an Ethernet message to allow for transmission over a PON, the external protocol extension message comprising a header that indicates an external protocol extension and at least one type-length-value (TLV) comprising a type field, a length field, and a value field,
wherein a format of the TLV is specified by a specific standards organization or enterprise, and
wherein the value field comprises information related to protocol functions external to the PON.

2. The apparatus of claim 1, wherein the external protocol extension message is an operation, administration, and maintenance (OAM) Packet Data Unit (PDU), and wherein the header comprises a length/type equal to about 88-09, a subtype equal to about 0x03, a code equal to about 0xFE, and an organization unique identifier (OUI).

3. The apparatus of claim 1, wherein the external protocol extension message is a slow protocol Packet Data Unit (PDU), and wherein the header comprises a length/type that indicates a slow protocol, a subtype equal to about 0xFE, and an organization unique identifier (OUI).

4. The apparatus of claim 1, wherein the external protocol extension message is an Ethernet Media Access Control (MAC) frame, wherein the header comprises an Ethernet type equal to about 0x88b5 or 0x88b6, and a protocol type for external message.

5. The apparatus of claim 1, wherein the external protocol extension message is an Ethernet Media Access Control (MAC) frame, wherein the header comprises an Ethernet type equal to about 0x88b7, an organization unique identifier (OUI), and a protocol type for external message.

6. The apparatus of claim 1, wherein the external protocol extension message is an Ethernet Media Access Control (MAC) frame, wherein the header comprises a multicast address that corresponds to a specific channel for control and management information.

7. The apparatus of claim 1, wherein the external protocol extension message is an Ethernet Media Access Control (MAC) frame, wherein the header comprises a start of frame delimiter (SFD), a logical link identifier (LLID) that indicates an external channel that extends the network protocol, and a connection admission control (CAC).

8. The apparatus of claim 1, wherein the external protocol extension message is an Ethernet Media Access Control (MAC) frame, wherein the header comprises a type equal to about 0x8100 and a virtual local area network (VLAN) identifier (ID) that indicates an extension to the network protocol, and wherein the VLAN ID comprises a priority (PRI) field, a canonical format identifier (CFI), and a VLAN ID (VID) for external message.

9. The apparatus of claim 1, wherein the external protocol extension message is an Ethernet Media Access Control (MAC) frame, wherein the header comprises a logical link control (LLC) frame that indicates that an external protocol is extended to support the network, and wherein the LLC frame comprises a destination link service access point (LSAP), a source LSAP, and a LLC control information portion.

10. The apparatus of claim 1, wherein the external protocol extension message is a Multi-Point Control Protocol (MPCP) message, and wherein the header comprises a length/type equal to about 0x8808, a code equal to about 0xFE, and an organization unique identifier (OUI).

11. A passive optical network (PON) apparatus comprising:
at least one component configured to:
compile an external protocol extension message comprising one or more type-length-values (TLVs) and a header that indicates the external protocol extension message comprises information related to protocol functions for another network that is external to a PON comprising the apparatus, and
transmit the external protocol extension message.

12. The apparatus of claim 11, wherein the organization-specific TLVs are formatted based on a specific standards organization or enterprise format.

13. The apparatus of claim 11, wherein the organization-specific TLVs are derived from Optical Network Terminal (ONT) Management Control Interface (OMCI) messages, and wherein the external protocol extension message is transmitted using Ethernet.

14. The apparatus of claim 11, wherein the organization-specific TLVs are derived from physical layer operation, administration, and maintenance (PLOAM) messages.

15. The apparatus of claim 11, wherein the TLVs in the external protocol extension message comprise different control messages.

16. The apparatus of claim 11, wherein the at least one component is further configured to:
receive a second external protocol extension message comprising one or more second TLVs and a second header that indicates a second external protocol extension;
obtain the second TLVs from the second external protocol extension message; and
decode a control information in the second TLVs.

17. A method to be performed in a passive optical network (PON) comprising:
adding a header to a protocol extension message, wherein the header indicates that the protocol extension message comprises an organizational-specific protocol extension related to protocol functions external to the PON;
formatting a control information according to an organizational format;
adding the control information to the protocol extension message;
adding a footer to the protocol extension message; and
transmitting the protocol extension message to components external to the PON.

18. The method of claim 17 further comprising:
receiving the protocol extension message; and
interpreting the control information using the organizational format, and
obtaining the control information.

19. The method of claim 17 further comprising padding a remaining portion of the protocol extension message when the size of the control information does not exceed a payload length of the protocol extension message.

20. The method of claim 17, wherein the control information relates to advanced features of a PON standard or a Multi-Point Control Protocol (MPCP) protocol.

21. The method of claim 17, wherein the organizational-specific protocol extension and organizational format are defined by a standards organization or enterprise.

* * * * *